US008473955B2

United States Patent
Nelson et al.

(10) Patent No.: US 8,473,955 B2
(45) Date of Patent: *Jun. 25, 2013

(54) REDUCING PROCESSING OVERHEAD AND STORAGE COST BY BATCHING TASK RECORDS AND CONVERTING TO AUDIT RECORDS

(75) Inventors: Kenneth Carlin Nelson, Hollister, CA (US); Brett Edward Morris, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/404,654

(22) Filed: Feb. 24, 2012

(65) Prior Publication Data

US 2012/0159492 A1     Jun. 21, 2012

Related U.S. Application Data

(63) Continuation of application No. 12/509,342, filed on Jul. 24, 2009.

(51) Int. Cl.
*G06F 9/46*     (2006.01)
(52) U.S. Cl.
USPC ............................. 718/101; 718/102
(58) Field of Classification Search
USPC ................................................ 718/100, 101
See application file for complete search history.

(56) References Cited

U.S. PATENT DOCUMENTS

| 5,864,671 | A  | * | 1/1999  | Hagersten et al. | 709/213 |
| 5,878,220 | A  | * | 3/1999  | Olkin et al. | 709/217 |
| 7,565,581 | B1 | * | 7/2009  | Halligan et al. | 714/51 |
| 7,721,287 | B2 | * | 5/2010  | Wu | 718/101 |
| 7,765,549 | B1 | * | 7/2010  | Lauer | 718/101 |
| 2005/0097149 | A1 |  | 5/2005  | Vaitzblit et al. | |
| 2006/0200446 | A1 | * | 9/2006  | Gursky et al. | 707/2 |
| 2006/0294521 | A1 | * | 12/2006 | Wietlisbach et al. | 718/101 |
| 2007/0143756 | A1 | * | 6/2007  | Gokhale | 718/100 |
| 2007/0239743 | A1 |  | 10/2007 | Wong | |
| 2011/0023034 | A1 |  | 1/2011  | Nelson et al. | |

OTHER PUBLICATIONS

Sun Microsystems, "System Administration Guide: Security Services," Retrieved on Mar. 2, 2009.

* cited by examiner

*Primary Examiner* — Jennifer To
*Assistant Examiner* — Blake Kumabe
(74) *Attorney, Agent, or Firm* — Patterson & Sheridan, LLP (57) ABSTRACT

Systems, methods and articles of manufacture are disclosed for processing documents for electronic discovery. A request may be received to perform a task on documents, each document having a distinct document identifier. A task record may be generated to represent the requested task. The task record may include information specific to the request task. However, the task record need not include any document identifiers. At least one batch record may be generated that includes the document identifier for each of the documents. The task record may be associated with the at least one batch record. The requested task may be performed according to the task record and the at least one batch record. An audit record may be generated for the performed task. The audit record may be associated with the at least one batch record.

19 Claims, 5 Drawing Sheets

REDUCING PROCESSING OVERHEAD AND STORAGE COST BY BATCHING TASK RECORDS AND CONVERTING TO AUDIT RECORDS

CROSS REFERENCE TO RELATED APPLICATIONS

This application is a continuation of co-pending U.S. patent application Ser. No. 12/509,342, filed Jul. 24, 2009. The aforementioned related patent application is herein incorporated by reference in its entirety.

BACKGROUND OF THE INVENTION

1. Field of the Invention

Embodiments of the invention relate to techniques for managing electronic records. More specifically, embodiments of the invention relate to processing documents for electronic discovery.

2. Description of the Related Art

Electronic discovery in legal proceedings frequently involves vast amounts of data. For example, electronic discovery may require a party to litigation to perform a common task on millions of documents. For example, a user may export a set of email documents from a backup or a production environment to a document database used for a legal proceeding. When requests for documents from the database are needed (e.g., for a document production), the database may need to export a large number of documents. Further, an electronic discovery application may maintain an audit record of each task performed. Typically, such applications create one or more task records to represent a task requested to be performed. Further, such applications typically create: (i) a task record for each document on which the task is to be performed and (ii) an audit record for each document processed by the task. Such a task may be performed asynchronous relative to a time that the task is requested. That is, the task may be queued to occur at a later time than the time of the request. An example of a task to be queued is a task that may take several hours to complete. Further, overhead is incurred for each document being processed during the task. Overhead may result from operations such as creating audit records and deleting task record. Such overhead may impair system performance, especially for large numbers of documents.

SUMMARY OF THE INVENTION

One embodiment of the invention includes a method, the method including configuring one or more computer processors to perform an operation for processing electronic documents. The operation may generally include receiving a request to perform a task on a plurality of the electronic documents. Each electronic document may have a distinct document identifier. The method may also include generating a single task record stored in a database. The single task record represents the requested task to be performed on the plurality of electronic documents. The method may also include generating at least one batch record stored in a database which includes the document identifier for each document. The method may further include associating the task record with the at least one batch record and performing the task specified by the single task record on the plurality of documents specified by the at least one batch record. The method may further include generating an audit record for the performed task and associating the audit record with the at least one batch record.

Another embodiment of the invention includes a computer readable storage medium storing a program, which, when executed on a processor performs an operation. The operation may generally include receiving a request to perform a task on a plurality of the electronic documents. Each electronic document may have a distinct document identifier. The operation may further include generating a single task record stored in a database. The single task record represents the requested task to be performed on the plurality of electronic documents. The operation may also include generating at least one batch record stored in a database which includes the document identifier for each document. The operation may further include associating the task record with the at least one batch record and performing the task specified by the single task record on the documents specified by the batch record. The operation may further include generating an audit record for the performed task and associating the audit record with the at least one batch record.

Still another embodiment of the invention includes a system having a computer processor and a memory containing a program, which when executed by the computer processor is configured to perform an operation for processing electronic documents. The operation may generally include receiving a request to perform a task on a plurality of the electronic documents. Each electronic document may have a distinct document identifier. The operation may further include generating a single task record stored in a database. The single task record represents the requested task to be performed on the plurality of electronic documents. The operation may also include generating at least one batch record stored in a database which includes the document identifier for each document. The operation may further include associating the task record with the at least one batch record and performing the task specified by the single task record on the documents specified by the batch record. The operation may further include generating an audit record for the performed task and associating the audit record with the at least one batch record.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention generally provide techniques for managing electronic records. One embodiment of the invention provides an application configured to process documents for electronic discovery. For example, during civil litigation, opposing parties may engage in discovery. During discovery, one party may request electronic documents (e.g., email messages) held by an opposing party. One embodiment of the invention provides an electronic discovery application. Software, such as such as IBM® InfoSphere™ eDiscovery Manager, may be configured to collect, organize, manage, and/or retrieve relevant documents for electronic discovery. The relevant information may include text (such as email messages), multimedia (such as images and audio files), databases, spreadsheets, etc.

In one embodiment, the electronic discovery application may receive a request to perform a task on a specified collection documents. The electronic discovery application may create a task record that includes information specific to a requested task (e.g., a user ID, a timestamp, a task to be performed, etc.). However, the task record need not include any document identifiers. Instead, document identifiers may be included in a batch record. Document identifiers or "doc IDs" each identify a distinct document, typically represented using unique strings, integers, or long numbers. Each batch record may store up to a predefined maximum number of document identifiers. While the predefined maximum number of document identifiers may be tailored to suit a particular case, a maximum of two thousand document identifiers has proven useful in some cases. The task record includes a link to the at least one batch record. In processing the task, the link to the batch record may be dropped from the task record and added to an audit record representing the performed task. Further, the task record may indicate an outcome of performing the task, such as a start time, an end time, and a number of errors encountered. By avoiding the need to delete the task record and create an audit record for each document, tasks may be performed more efficiently. In other words, the overhead associated with performing a task may be reduced, as a single task record references many document identifiers. For example, a "foldering rate" (the rate at which documents may be moved to a specified folder) of the electronic discovery application may be improved as a result. Further, overhead related to creating/managing task/audit records may be reduced (e.g., because fewer records are stored). Thus, the electronic discovery application may process documents more efficiently.

In one embodiment, the document identifiers stored in a batch record may be stored in a field of a database record. The field may be a large object (LOB), such as binary large object (BLOB), character large object (CLOB), etc. As is known, a LOB is a data type for storing data in a database. A BLOB is a data type for storing binary data, while a CLOB is a data type for storing character data. In one embodiment, the task record for a requested task and the audit record for the requested task may both store a link to at least one batch record, each batch record storing a pointer to a LOB that includes the particular document identifiers for the requested task. As a result, the electronic discovery application may create audit records more efficiently (e.g., by not having to copy the LOB). In other words, the overhead associated with performing a task may be further reduced. Thus also, the electronic discovery application may process documents more efficiently.

While embodiments may be described herein with reference to an electronic discovery application, those skilled in the art will recognize that embodiments of the invention may be adapted to support tack creation/auditing in other document management systems generally.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
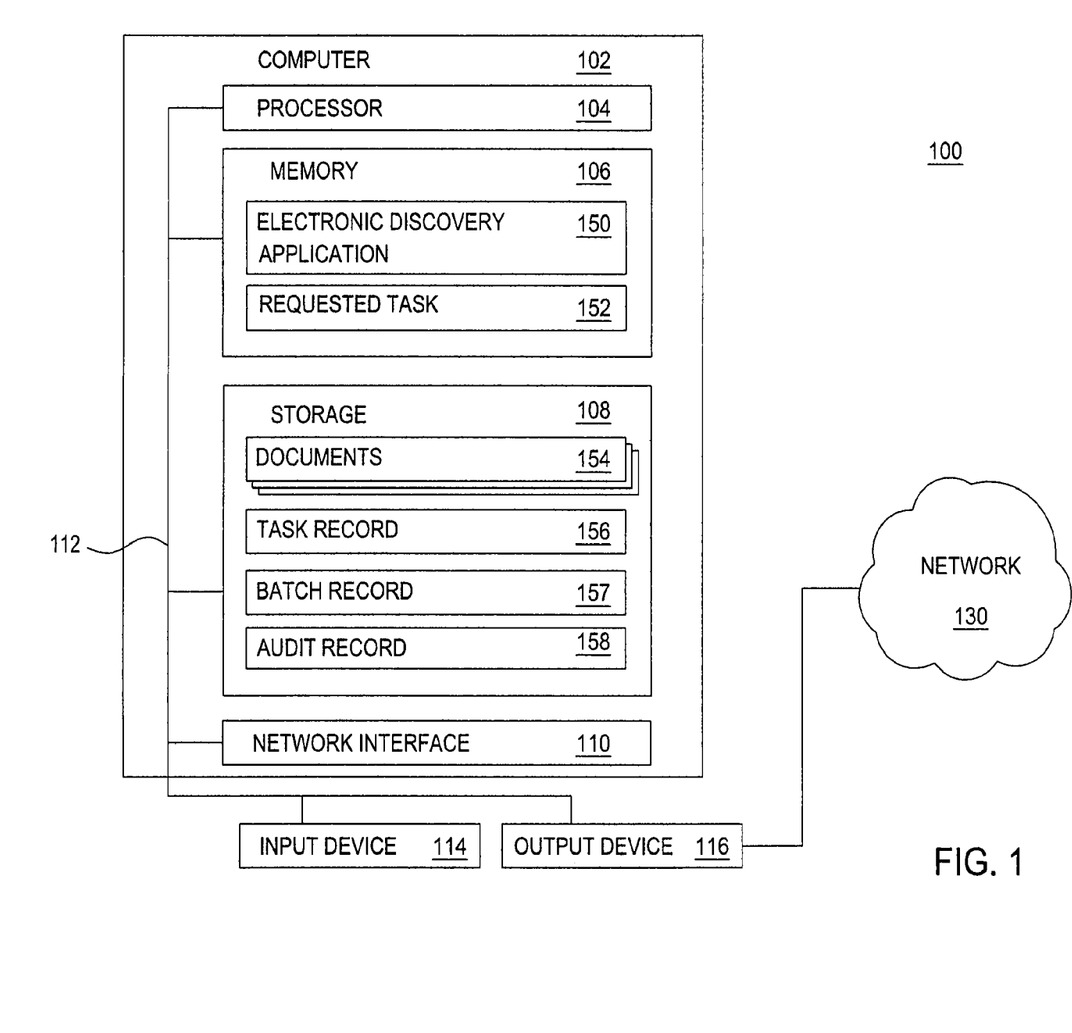
FIG. 1 is a block diagram illustrating a system for processing documents, according to one embodiment of the invention.

FIG. 1 is a block diagram illustrating a system 100 for processing documents, according to one embodiment of the invention. The networked system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards (not shown). Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 includes an electronic discovery application 150 and a requested task 152. Those skilled in the art will recognize that embodiments of the invention may be adapted to support applications other than the electronic discovery application 150, such as document management systems generally, or any application that processes documents (e.g., that works in conjunction with a document management system). The storage 108 includes documents 154, a task record 156, a batch record 157, and an audit record 158. FIGS. 2 through 5 and associated descriptions detail the structure and operation of the electronic discovery application 150 running on the computer 102.

Figure 2:
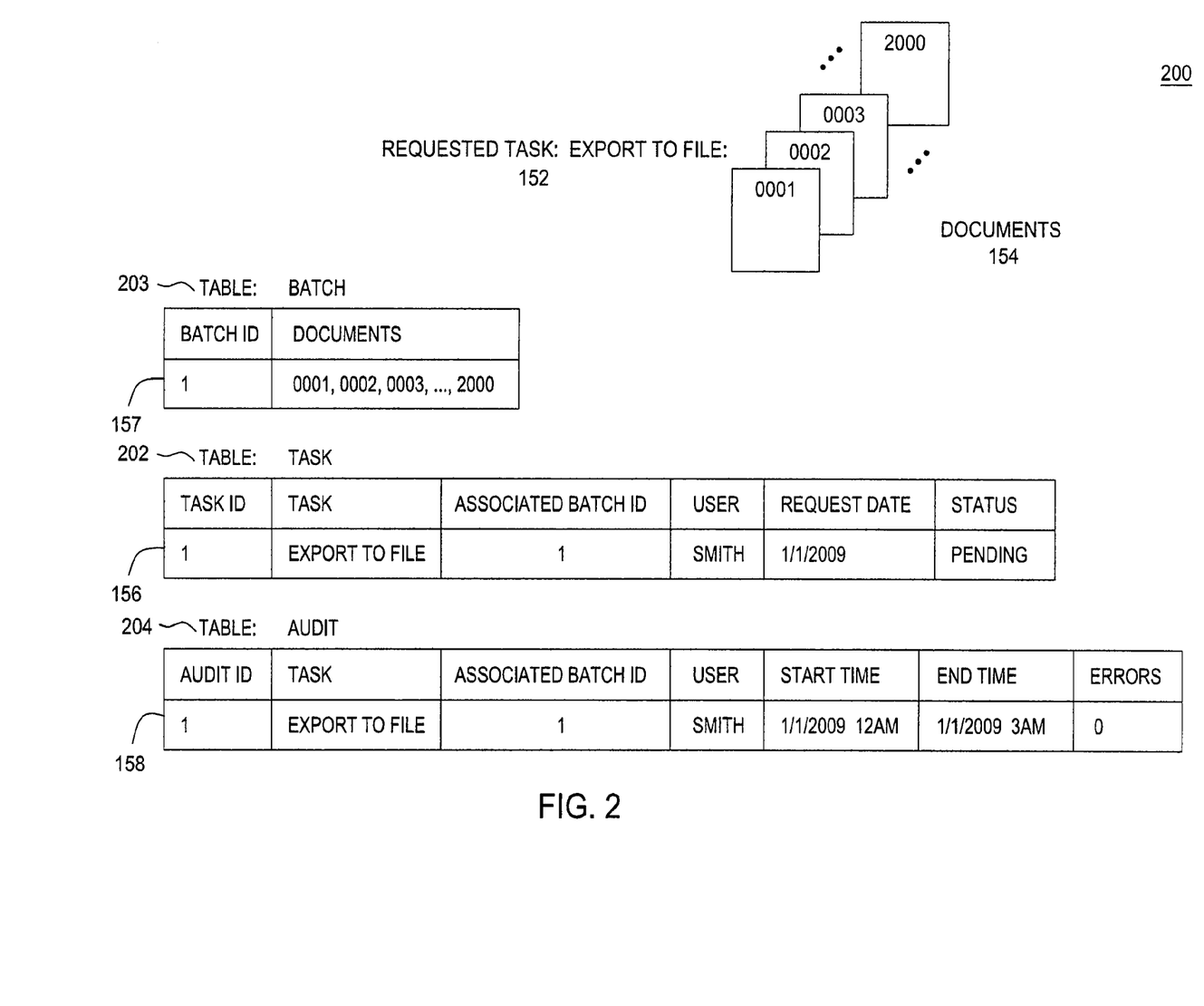
FIG. 2 is a diagram illustrating records created from processing a requested task, according to one embodiment.

FIG. 2 is a diagram 200 illustrating records created from processing a requested task 152, according to one embodiment. As shown, the records include a task record 156 and an audit record 156. The task record may be inserted into a task table 202 of a database, according to one embodiment. Similarly, the audit record 156 may be inserted into an audit table 204 of the database, and the batch record 157 may be inserted into a batch table 203 of the database.

Upon receiving a request to perform the task, the electronic discovery application 150 may generate a task record 156 representing the requested task 152. For example, a user may request to export documents 154 from the electronic discovery application 150 having document identifiers 0001 through 2000 (for instance, the documents 154 may be email messages). Alternatively, the user may compose a query used to identify a group of documents that satisfy conditions specified in the query. The documents 154 may be from any source of electronic documents, such as content management systems (CMS) (e.g., IBM® Lotus® Quikr™ and Microsoft® SharePoint®), document management systems (DMS) (e.g., IBM® Content Manager), any document repository generally, and the like.

Rather than generate a task record for each document identifier and then execute the task from the records in a batch job, the electronic discovery application 150 may generate: (i) a task record 156 that includes fields storing information pertaining to a requested task 152 and (ii) at least one batch record 157 that includes document identifiers for all of the documents 154 (shown in FIG. 2 as having a batch ID of 1). In this example, the fields include task ID, task name, a list of documents on which the task is to be performed, a user requesting the task 152, a date of the request, a status of the task, and the like. For instance, the task record 156 indicates that the task "export to file" is to be performed on documents referenced by the batch record having a batch ID of 1 (namely, the documents 0001 through 2000), as requested by "Smith" on Jan. 1, 2009. Further, the task has a task ID of 1 and a task status of "Pending."

In one embodiment, each batch record 157 may include up to a predefined maximum number of document identifiers. In one embodiment, the predefined maximum number of document identifiers represents a tradeoff between at least: (i) reduced overhead in creating and maintaining batch records (for a larger maximum) and (ii) reduced likelihood of failing a task (for a smaller maximum). For example, a maximum of ten document identifiers may nevertheless yield a relatively high overhead in creating and managing task/audit records (e.g., database I/O), relative to a maximum of one document identifier. Further, a maximum of ten thousand document identifiers may yield a likelihood of task failure insufficient to justify any reduced overhead in creating and managing task/audit records. And while the predefined maximum number of document identifiers may be tailored to suit a particular case, the maximum of two thousand document identifiers has proven useful in some cases. Specifically, in some cases, allowing two thousand (rather than only one) document identifiers in each batch record 157 may yield a reduced overhead in creating and maintaining batch records (and thus, in processing tasks). However, allowing ten thousand (rather than two thousand) document identifiers in each batch record 157 may only slightly reduce overhead (if at all) in creating and maintaining batch records in some cases.

If the requested task 152 specifies more than the maximum number of document identifiers, then the electronic discovery application 150 may generate more than one batch record 157. For example, assume a predefined maximum number of two thousand document identifiers. If the requested task 152 is to be performed on five thousand documents, the electronic discovery application may generate three batch records 157. For instance, the electronic discovery application 150 may generate two batch records 157 each including two thousand document identifiers and a third batch record 157 including one thousand document identifiers. In this case, the requested task 152 is represented by the three generated batch records 157.

After creating the task record 156 and the at least one batch record 157, the electronic discovery application 150 may perform the requested task 152 based on the task record 156 and the at least one batch record 157. In one embodiment, the task may be performed asynchronously relative to a time that the task is requested. That is, the task may be queued to be performed at a later time than the time of the request (e.g., for tasks that may take several hours to complete). However, task records may be generated for both synchronous and asynchronous tasks. In such a case, the electronic discovery application 150 may determine whether to perform a task asynchronously based upon the requested task 152 and a count of the documents 154.

Once the requested task 152 is performed, the electronic discovery application 150 may generate an audit record 158 for the performed task. The electronic discovery application 150 may: (i) modify the task record 156 to include an outcome of performing the requested task 152 and/or (ii) maintain the task record 156 in the database. In another embodiment, the electronic discovery application 150 may delete (rather than maintain) the task record 156 for the performed task. Further, because document identifiers are stored in one or more batch records 157 (as opposed to being stored in the task record and/or the audit record), the electronic discovery application 150 may generate a single audit record 158 that links to the at least one batch record 157 for all of the document identifiers. The audit record 158 may include fields that store information pertaining to a performed task. As shown, the fields include an audit ID, task name, documents on which the task has been performed, a user who requested the task, a time at which the task began processing, a time at which the task completed processing, a count of errors encountered during the task, and the like. For instance, the audit record 158 indicates that, as requested by "Smith," the task "export to file" was performed on the documents 0001 through 2000, beginning at 12 am on Jan. 2, 2009 and ending at 3 am on Jan. 2, 2009, with no errors encountered.

In one embodiment, if the electronic discovery application 150 detects that a count of errors that occur in performing the requested task 152 exceeds a specified threshold, then the electronic discovery application 150 may abort the requested task 152 and mark the task record 156 as failed. The electronic discovery application 150 may also discard any incomplete output of a failed task. For example, if half of two hundred emails fail to be exported to a specified file, the electronic discovery application 150 may discard the specified file.

As shown in FIG. 2, the at least one batch record 157 includes document identifiers for all of the documents 152. In one embodiment, the at least one batch record 157 stores document identifiers in a single field (e.g., the "Documents" field of the BATCH table 203, respectively). For example, the "Documents" field may be a BLOB data type in the BATCH table 203. In another embodiment, each task record 156 and associated audit record 158 may store a pointer to a BLOB data type (e.g., in yet another table for storing BLOBs). Thus, an audit record 156 generated by the system may point to the at least one batch record 157 associated with the task record, once the task is performed. In other words, audit records may be generated without copying document identifiers from task records to audit records. As a result, the overhead required to process the documents 152 in a task may be reduced.

Figure 3:
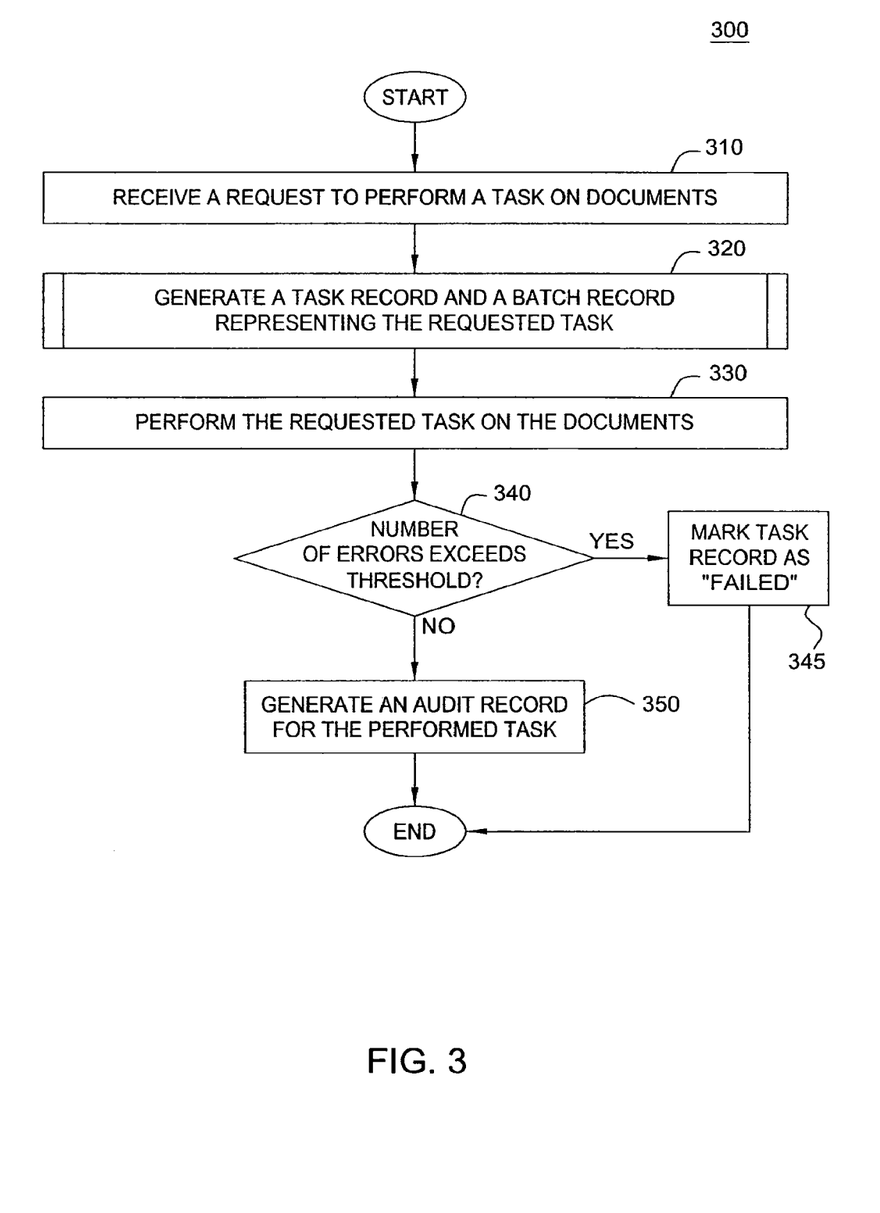
FIG. 3 is a flowchart depicting a method for processing documents for electronic discovery, according to one embodiment of the invention.

FIG. 3 is a flowchart depicting a method 300 for processing documents, according to one embodiment of the invention. The method 300 may be performed by the electronic discovery application 150 of FIG. 1. As shown, the method 300 begins at step 310, where the electronic discovery application 150 receives a request to perform a task 152 on a specified set of documents. Typically, each document is identified using a distinct document identifier. For example, a user may specify to export specified email messages to a file. For instance, the file may be in an EML (Microsoft® Outlook®) format, a NSF (IBM® Lotus® Domino®) format, or an XML format, among others. Other examples of tasks include adding search results to a folder (the search results may include documents responsive to a search), moving documents from a first folder to a second folder, deleting documents from a folder, exporting documents to a file, and marking documents to be retained (e.g., based on a document retention policy of a business).

At step 320, the electronic discovery application 150 generates a task record representing the requested task 152. Further, the electronic discovery application 150 may generate one or more batch records 157. The task record 156 may then reference (i.e., via one or more batch records 157) document identifiers for up to a maximum task record size (e.g., 2000 documents). In cases where the number of documents in the batch job exceed the size of a single batch record (e.g. >2000 documents), multiple batch records 157 may be created. Including document identifiers for all of the documents 154 (and thereby not having to create a separate task record for each document identifier) reduces the overhead of processing the documents 154. An example of a generated task record 156 and generated one or more batch records 157 is shown in FIG. 2. Generating the task record (and one or more batch records 157) is further described below in conjunction with FIG. 4.

At step 330, the electronic discovery application 150 may perform the requested task 152 on the documents 154 identified in the task records (and associated batch record(s) 157). For example, the electronic discovery application 150 may export specified email messages to a file. Further, the electronic discovery application 150 may also track any errors that occur while performing the task 152. For example, in some cases a document may be "missing." For instance, a document management system may list the document as being present when the document has in fact been deleted. In such cases, having only a few errors (relative to the number of documents being processed by the requested task 152) is not a sufficient reason to abort the requested task 152. However, if the number of errors rises to a substantial percentage of the requested task 152, then the electronic discovery application may fail the requested task 152 as a whole. At step 340, the electronic discovery application 150 determines whether the count exceeds a predefined threshold. If so, then at step 345, the electronic discovery application 150 may mark the task record as "failed" (e.g., by updating the "Status" field of the TASK table 202 of FIG. 2). In other words, if the number of errors exceeds the predefined threshold, the electronic discovery application 150 may simply mark the task record 156 as "failed," so a user may later review, rectify, and/or reinitiate the task. For example, if a task fails because the CMS server storing the documents is offline, a user may later reinitiate the task when the CMS server is back online. Accordingly, if the number of errors exceeds the predefined threshold, an audit record 158 is not created for the requested task 152. After step 345, the method 300 terminates.

However, if the electronic discovery application 150 determines that the error count does not exceed the predefined threshold, then at step 350, the electronic discovery application 150 generates an audit record 158 for the performed task. Like the task record 156, the audit record 158 may also store a link to the one or more batch records 157 that include document identifiers for all of the documents 154. FIG. 2 shows an example of such an audit record 158. Further, the electronic discovery application 150 may dissociate the task record 156 from the one or more batch records 157. After step 350, the method 300 terminates.

Figure 4:
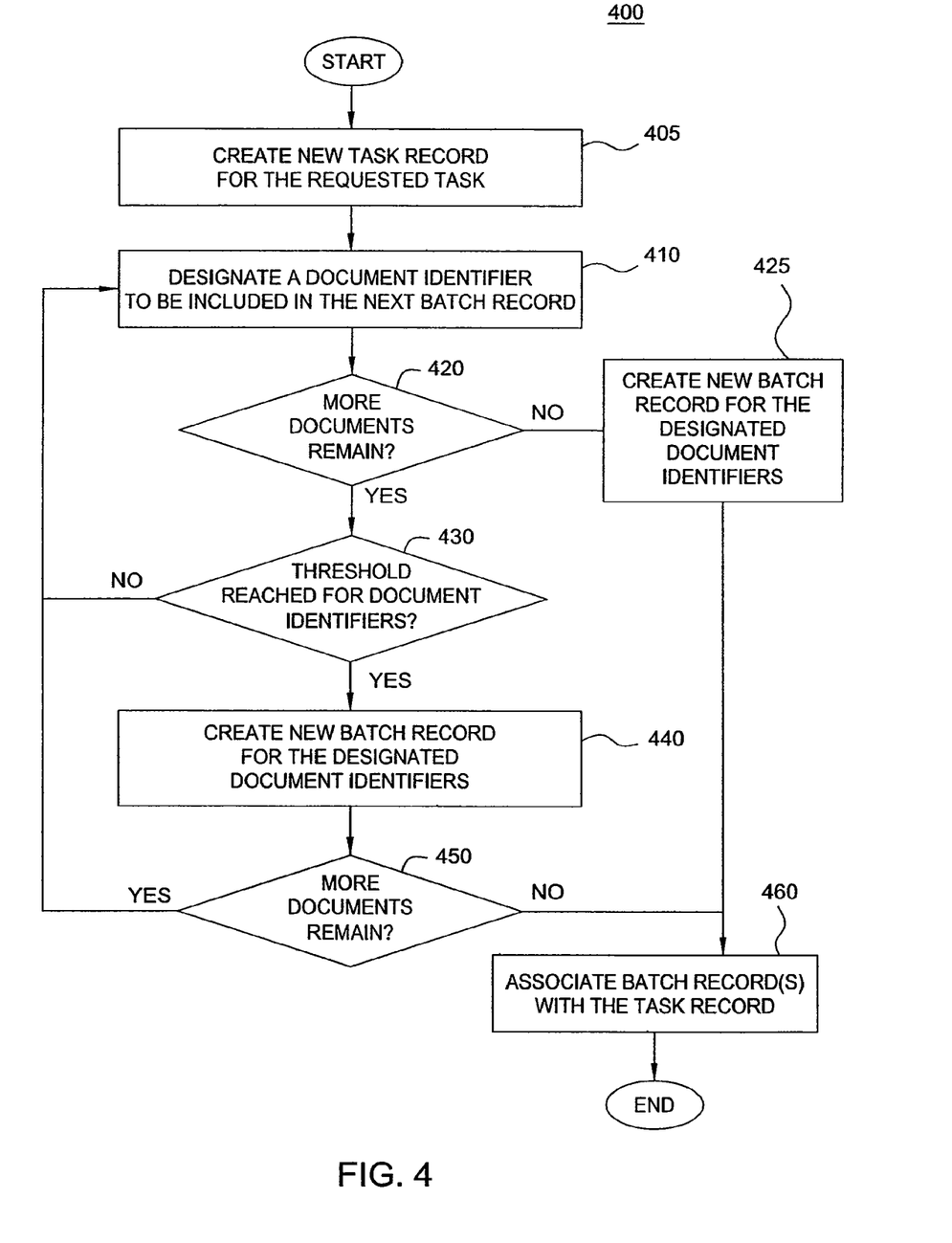
FIG. 4 is a flowchart depicting a method for generating a task record representing the requested task, according to one embodiment of the invention.

FIG. 4 is a flowchart depicting a method 400 for generating a task record 156 representing a requested task 152, according to one embodiment of the invention. The method 400 may be performed by the electronic discovery application 150 of FIG. 1. Further, the method 400 may correspond to step 320 of FIG. 3. As shown, the method 400 begins at step 405, where the electronic discovery application 150 creates a new task record 156 for the requested task 152. For example, FIG. 2 illustrates a task record 156 for the requested task 152. At step 410, the electronic discovery application 150 designates a document identifier to be included in a batch record 157. For example, the document identifier may be concatenated to a string that represents a BLOB. The string may later be programmatically bound to a Structured Query Language (SQL) INSERT statement for inserting the task record 156 into the TASK table 202.

At step 420, the electronic discovery application 150 determines whether more documents 154 remain. If not, then at step 425, where the electronic discovery application 150 creates a new batch record for the designated document identifier (s). For example, the electronic discovery application 150 may bind the string to an INSERT statement and execute the INSERT statement against a database. The electronic discovery application 150 then associates the created batch record (s) with the task record (step 460), after which the method 400 terminates. Otherwise, if more documents remain, then at step 430, the electronic discovery application 150 determines whether a predefined threshold has been reached for document identifiers. As noted above, the predefined threshold for document identifiers specifies a maximum number of document identifiers to be included in a single batch record 157. For example, a limit of two thousand document identifiers may be set for a single batch record 157.

If the predefined threshold for document identifiers has not been reached, another document identifier is added to the current batch record (step 410). However, if the predefined threshold has been reached, then at step 440, the electronic discovery application 440 creates a new batch record for the designated document identifiers. In one embodiment, the new batch record created at step 440 differs from the new batch record created at step 425 in that the former includes a maximum number of document identifiers while the latter includes less than the maximum number of document identifiers. At step 450, the electronic discovery application 150 determines whether more documents remain. If so, the method returns to step 410, where the electronic discovery applications includes another next document identifier in the task record. Otherwise, the electronic discovery application 150 associates the created batch record(s) with the task record (step 460). After step 460, the method 400 terminates.

Figure 5:
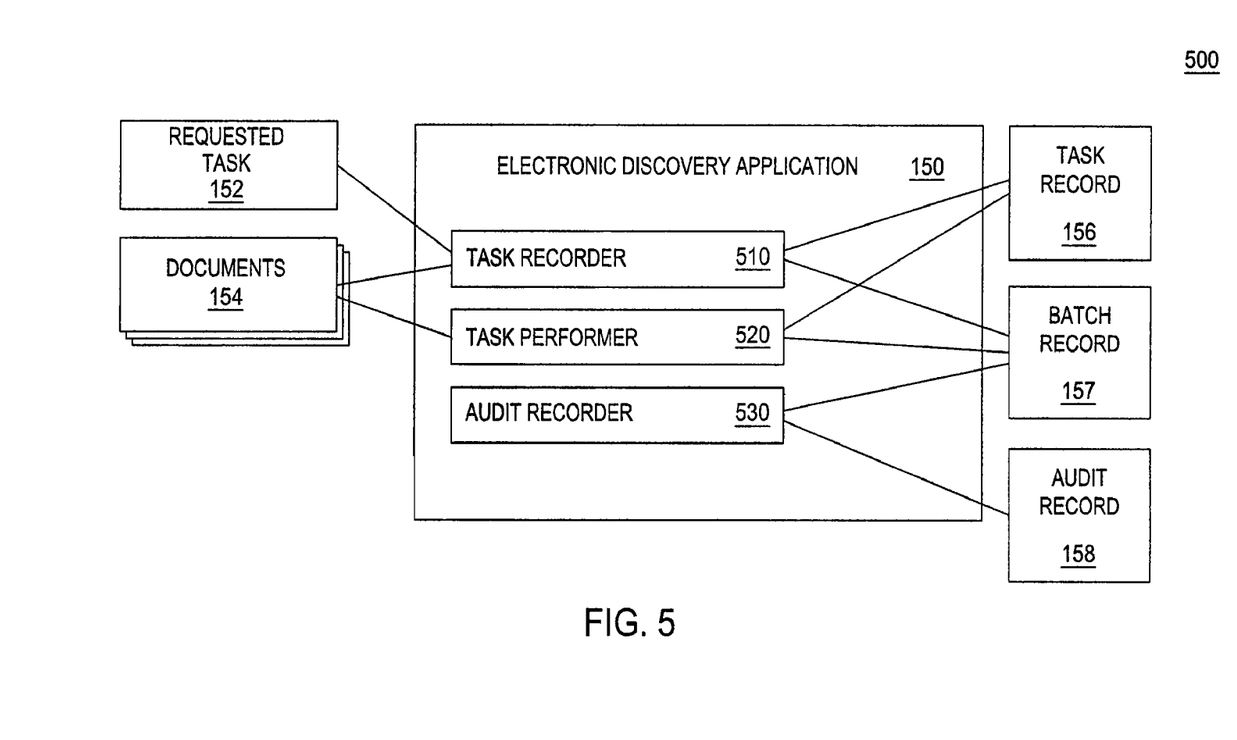
FIG. 5 is a block diagram illustrating components of an electronic discovery application, according to one embodiment of the invention.

FIG. 5 is a block diagram illustrating components 500 of the electronic discovery application 150 of FIG. 1, according to one embodiment of the invention. As shown, the electronic discovery application 150 includes a task recorder 510, a task performer 520, and an audit recorder 530.

In one embodiment, the task recorder 510 receives a request to perform the task 152 on the documents 154. For example, a user may request to export specified email messages to a file. The task recorder 510 may generate a task record 156 representing the requested task 152 to be performed on the documents 154. The task recorder 510 may also generate at least one batch record 157 that includes a document identifier for each documents 154 included in the task.

In one embodiment, the task performer 520 executes the requested task 152 based on the generated task record 156 and the at least one batch record 157. For example, the task performer 520 may export the specified email messages to the file. Further, the task performer 520 may also monitor errors incurred by the task 152 (e.g., type of errors, count of errors, etc.). Upon determining that the task 152 incurred beyond a predefined threshold number of errors, the task performer 520 may mark the task record 156 as "failed." Otherwise, the audit recorder 530 may generate an audit record 158 to represent the performed task (and based at least in part on the task record 156).

Of course, the embodiments described herein are intended to be illustrative and not limiting of the invention, and other embodiments are broadly contemplated. Further, those skilled in the art will recognize that embodiments of the invention may be adapted to support other tasks; other ways of storing task records, batch records, and audit records; other ways of including document identifiers in a batch record; applications other than electronic discovery applications; etc.

Advantageously, embodiments of the invention provide techniques for managing electronic records. In one embodiment, an electronic discovery application processes documents for electronic discovery. The electronic discovery application may receive a request to perform a task on documents. The electronic discovery application may generate: (i) a task record representing the requested task and (ii) at least one batch record that includes document identifiers for all of the documents. The electronic discovery application may also associate the at least one batch record with the task record. The electronic discovery application may perform the requested task according to the task record. The electronic discovery application may generate an audit record for the performed task and associate the audit record with the at least one batch record. By not generating a separate task record and/or audit record for each document identifier, the overhead (e.g., database I/O) of processing the documents is reduced. Thus, the documents may be processed more efficiently. Similarly, the storage cost for the task records and audit records may also be reduced. Further, the document identifiers need not be copied or deleted when an audit record is generated. The overhead of processing the documents is thereby further reduced.

While the foregoing is directed to embodiments of the present invention, other and further embodiments of the invention may be devised without departing from the basic scope thereof, and the scope thereof is determined by the claims that follow.

What is claimed is:

1. A computer-implemented method to reduce an electronic discovery processing overhead of a plurality of electronic documents, the method comprising:

receiving a request to perform a task on a specified set of electronic documents, each electronic document having a distinct document identifier;

generating a single task record stored in a database, the single task record representing the requested task to be performed on a plurality of electronic documents from the specified set of electronic documents;

generating, by operation of one or more computer processors, at least one batch record stored in a database, the at least one batch record including at least the document identifier for each electronic document, wherein the at least one batch record is fewer in number than the plurality of electronic documents;

associating the task record with the at least one batch record;

performing the task specified by the single task record on the plurality of electronic documents specified by the at least one batch record; and upon determining that a predefined threshold number of errors is not exceeded in performing the task:
generating a single audit record for the performed task;
associating the single audit record with the at least one batch record; and
dissociating the task record from the at least one batch record.

2. The computer-implemented method of claim 1, wherein the at least one batch record stores the document identifiers as a field in the database.

3. The computer-implemented method of claim 2, wherein the field is a large object (LOB) field.

4. The computer-implemented method of claim 1, wherein associating the task record and the audit record with the at least one batch record comprises storing, in the task record and in the audit record, a link to the at least one batch record.

5. The computer-implemented method of claim 1, wherein the requested task is performed asynchronously to receiving the request.

6. The computer-implemented method of claim 1, wherein the requested task is selected from at least exporting documents to a file, declaring documents as records, adding documents from search results to a folder, and moving documents from a first folder to a second folder.

7. The computer-implemented method of claim 1, wherein each batch record stores up to a predefined maximum number of document identifiers.

8. The computer-implemented method of claim 1, wherein the at least one batch record consists of a single batch record, wherein the plurality of documents are the specified set of documents.

9. The computer-implemented method of claim 8, wherein the electronic discovery processing overhead of the specified set of documents is reduced relative to generating a respective task record and a respective audit record for each document of the specified set of documents.

10. The computer-implemented method of claim 9, wherein storage costs associated with the specified set of documents is reduced relative to generating a respective task record and a respective audit record for each document of the specified set of documents.

11. The computer-implemented method of claim 10, wherein the single audit record is generated without requiring any document identifier to be copied and without requiring any document identifier to be deleted, thereby further reducing the electronic discovery processing overhead of the specified set of documents.

12. The computer-implemented method of claim 11, wherein the audit record is generated only upon determining that a predefined threshold number of errors is not exceeded in performing the task.

13. The computer-implemented method of claim 12, further comprising:

dissociating the task record from the at least one batch record upon determining that a predefined threshold number of errors is not exceeded in performing the task.

14. The computer-implemented method of claim 13, wherein the at least one batch record stores the document identifiers as a field in the database, wherein the field is a large object (LOB) field, wherein associating the task record and the audit record with the at least one batch record comprises storing, in the task record and in the audit record, a link to the at least one batch record, wherein the requested task is performed asynchronously to receiving the request.

15. The computer-implemented method of claim 14, wherein batch record is generated by an electronic discovery application, wherein the electronic discovery application is configured to perform each requested task selected from exporting documents to a file, declaring documents as records, adding documents from search results to a folder, and moving documents from a first folder to a second folder, wherein each batch record stores up to a predefined maximum number of document identifiers.

16. The computer-implemented method of claim 15, wherein the electronic discovery application includes a task recorder module, a task perform module, and an audit recorder module, wherein the task recorder module is configured to:
(i) receive the request to perform the task on the specified set of documents; and
(ii) generate the single task record and the single batch record, respectively, for the specified set of documents.

17. The computer-implemented method of claim 16, wherein the task performer module is configured to:
(i) perform the requested task on the specified set of documents;
(ii) monitor errors incurred in performing the requested task; and
(iii) only upon detecting beyond a predefined threshold count of errors in performing the requested task, mark the requested task as failed.

18. The computer-implemented method of claim 17, wherein the audit recorder module is configured to, only upon successful completion of the requested task, generate the single audit record to represent the performed task.

19. The computer-implemented method of claim 18, wherein each batch record is stored in a batch table and includes a batch identifier and a set of document identifiers including a document identifier for each of the specified set of documents;
wherein each task record is stored in a task table and includes a task identifier, a task description, an associated batch identifier, a user identifier, a task request date, and a task status;
wherein each audit record is stored in an audit table and includes an audit identifier, a task description, an associated batch identifier, a user identifier, a task start time, a task end time, and an error count;
wherein the batch table, the task table, and the audit table are distinct tables in the database.

* * * * *